(12) United States Patent
Choh

(10) Patent No.: US 10,949,486 B2
(45) Date of Patent: Mar. 16, 2021

(54) ANCHORED MATCH ALGORITHM FOR MATCHING WITH LARGE SETS OF URL

(71) Applicant: Citrix Systems, Inc., Fort Lauderdale, FL (US)

(72) Inventor: Edward Wai Hong Choh, Richmond (CA)

(73) Assignee: Citrix Systems, Inc., Fort Lauderdale, FL (US)

( * ) Notice: Subject to any disclaimer, the term of this patent is extended or adjusted under 35 U.S.C. 154(b) by 138 days.

(21) Appl. No.: 15/710,337

(22) Filed: Sep. 20, 2017

(65) Prior Publication Data

US 2019/0087506 A1 Mar. 21, 2019

(51) Int. Cl.
| | |
|---|---|
| G06F 16/955 | (2019.01) |
| G06F 16/22 | (2019.01) |
| G06F 16/951 | (2019.01) |
| G06F 16/901 | (2019.01) |
| H04L 29/08 | (2006.01) |

(52) U.S. Cl.
CPC ...... *G06F 16/9566* (2019.01); *G06F 16/2255* (2019.01); *G06F 16/9014* (2019.01); *G06F 16/951* (2019.01); *H04L 67/1065* (2013.01)

(58) Field of Classification Search
CPC ............ G06F 16/9566; G06F 16/951; G06F 16/9535; G06F 16/2255; G06F 16/9014; G06F 16/9027; G06F 16/285; G06F 16/9024
USPC ....... 707/617, 649, 654, 739, 741, 747, 748, 707/754
See application file for complete search history.

(56) References Cited

U.S. PATENT DOCUMENTS

| | | |
|---|---|---|
| 7,016,963 B1 | 3/2006 | Judd et al. |
| 7,433,956 B2 | 10/2008 | Zhao et al. |

(Continued)

FOREIGN PATENT DOCUMENTS

| | | |
|---|---|---|
| AU | 2004100333 A4 | 6/2004 |
| EP | 1 376 410 A1 | 1/2004 |
| WO | WO-00/68823 A2 | 11/2000 |

OTHER PUBLICATIONS

Bhardwaj, et al., International Journal of Computer Applications, vol. 132—No. 17, Dec. 2015 "Efficient Wu Manber String Matching Algorithm for Large Number of Patterns" (5 pages).

(Continued)

*Primary Examiner* — Dangelino N Gortayo
(74) *Attorney, Agent, or Firm* — Foley & Lardner LLP

(57) ABSTRACT

Described embodiments may provide systems and methods for matching with indexed Uniform Resource Locator (URL) pattern sets. A device may establish a hash map of patterns. Each pattern may include a suffix of a URL and indexed by a hash of a host prefix of the URL. The hash map of patterns may include a first hash of a first host prefix of a first URL. The device may identify a second URL to match. The second URL may include a second host prefix and a second suffix. The device may calculate a second hash of the second host prefix. The device may determine that the second hash matches an index of the first hash of the hash map. The device may identify, responsive to the determination, a match between a first suffix of the first URL in the hash map and the second suffix of the second URL.

20 Claims, 6 Drawing Sheets

(56) References Cited

U.S. PATENT DOCUMENTS

| | | | |
|---|---|---|---|
| 7,774,380 B2* | 8/2010 | Burke | G06F 16/9027 707/803 |
| 7,930,365 B2 | 4/2011 | Dixit et al. | |
| 8,019,764 B1* | 9/2011 | Nucci | G06F 16/951 707/739 |
| 8,132,247 B2 | 3/2012 | Adhya et al. | |
| 8,135,831 B2* | 3/2012 | Sinclair | H04L 29/12009 707/747 |
| 8,543,726 B1 | 9/2013 | Kann et al. | |
| 8,667,146 B2 | 3/2014 | Agarwal et al. | |
| 8,799,310 B2* | 8/2014 | Kirshenbaum | G06Q 30/0201 707/769 |
| 8,799,515 B1 | 8/2014 | Wu | |
| 8,806,036 B1 | 8/2014 | Chickering | |
| 10,268,656 B1* | 4/2019 | Cheng | G06F 16/9566 |
| 2002/0184527 A1 | 12/2002 | Chun et al. | |
| 2004/0039822 A1 | 2/2004 | Bensimon | |
| 2004/0046789 A1 | 3/2004 | Inanoria | |
| 2004/0073629 A1 | 4/2004 | Bazot et al. | |
| 2005/0033745 A1* | 2/2005 | Wiener | G06F 16/30 |
| 2005/0055437 A1* | 3/2005 | Burckart | G06F 16/9014 709/224 |
| 2005/0251856 A1 | 11/2005 | Araujo et al. | |
| 2005/0262357 A1 | 11/2005 | Araujo et al. | |
| 2005/0273849 A1 | 12/2005 | Araujo et al. | |
| 2006/0005008 A1 | 1/2006 | Kao | |
| 2006/0037071 A1 | 2/2006 | Rao et al. | |
| 2006/0041637 A1 | 2/2006 | Jerrard-Dunne | |
| 2006/0112174 A1 | 5/2006 | L'Heureux et al. | |
| 2006/0218143 A1* | 9/2006 | Najork | G06F 16/951 |
| 2006/0259544 A1 | 11/2006 | Zubenko et al. | |
| 2007/0011340 A1 | 1/2007 | Seidl et al. | |
| 2007/0239732 A1 | 10/2007 | Dixit et al. | |
| 2007/0245409 A1 | 10/2007 | Harris et al. | |
| 2008/0028440 A1 | 1/2008 | Basol et al. | |
| 2008/0183902 A1 | 7/2008 | Cooper et al. | |
| 2008/0215563 A1* | 9/2008 | Shi | G06F 16/951 |
| 2009/0063538 A1* | 3/2009 | Chitrapura | G06F 16/9566 707/999.102 |
| 2009/0089874 A1 | 4/2009 | Mohanty et al. | |
| 2009/0106349 A1 | 4/2009 | Harris | |
| 2009/0158420 A1 | 6/2009 | Ks et al. | |
| 2009/0193126 A1 | 7/2009 | Agarwal et al. | |
| 2009/0193129 A1 | 7/2009 | Agarwal et al. | |
| 2010/0153568 A1 | 6/2010 | Uola et al. | |
| 2011/0153822 A1 | 6/2011 | Rajan et al. | |
| 2012/0278872 A1 | 11/2012 | Woelfel et al. | |
| 2013/0159711 A1 | 6/2013 | Kaal | |
| 2015/0356196 A1* | 12/2015 | Sreenivas Prasad | G06F 16/9535 707/740 |
| 2016/0149832 A1* | 5/2016 | Liang | H04L 47/821 |
| 2016/0253718 A1 | 9/2016 | Carasso | |
| 2017/0329860 A1* | 11/2017 | Jones | G06F 16/9566 |

OTHER PUBLICATIONS

"Aventail Smart Access: Secure and Easy for Users and IT." Jun. 21, 2006. http://www.findwhitepapers.com/force-download.php?id=255. Retrieved on Apr. 21, 2009 (8 pages).

"Remote Access Anytime, Anywhere." 2007. http://www.metadigm.co.uk/resources/documents/datasheets/checkpoint/Remote%20access/SSL_Network_Extender_whitepaper.pdf. Retrieved Apr. 21, 2009.

"User Guide for Cisco Security Manager 3.1." Sep. 24, 2007. http://www.cisco.com/en/US/docs/security/security_management/security_manager/3.1/user_guide/smcfg.pdf. Retrieved Apr. 21, 2009. pp. 799-854, 2555-2624.

"What's new in NGX: Connectra." Oct. 21, 2007. http://web.archive.org/web/20071021192852/http://www.checkpoint.com/ngx/upgrade/whatsnew/products/connectra.html. Retrieved on Apr. 21, 2009.

Citrix, "SSL VPN Deployment Guide: A Step-by-Step Technical Guide", 2007, pp. 1-41.

CN Office Action for Application No. 200980110432.5 dated Sep. 10, 2013.

CN Office Action for CN Appl. No. 200980110432.5, dated Dec. 21, 2012.

CN Office Action in CN Appl. No. 201610024019.9, dated Feb. 27, 2018.

EP Office Action for EP Appl. No. 09704724.5, dated Jun. 3, 2017.

Fifth Chinese Office Action for Chinese Application No. 200980110432.5 dated Apr. 16, 2015.

Final Office Action for U.S. Appl. No. 14/175,616, dated Jan. 12, 2018.

Fourth Chinese Office Action for Chinese Application No. 200980110432.5 dated Oct. 11, 2014.

IN Examination Report for Appl. No. 2726/KOLNP/2010, dated Jan. 18, 2017.

International Search Report and Written Opinion for International Appl. No. PCT/US2018/025405, dated Jun. 29, 2018.

International Search Report and Written Opinion for PCT Appl. No. PCT/US2009/032042, dated Jul. 10, 2009.

International Search Report and Written Opinion in PCT Application No. PCT/US2011/046172, dated Dec. 7, 2011.

Non-Final Office Action for U.S. Appl. No. 14/175,616, dated Jul. 26, 2018.

Non-Final Office Action for U.S. Appl. No. 15/482,423, dated Jun. 18, 2019.

Nortel Networks, "Configuring SSL VPN Services on the Contivity Secure IP Services Gateway", Version 5.00, Jun. 2004, pp. 1-232.

Notice of Allowance for U.S. Appl. No. 14/175,616, dated Dec. 17, 2018.

Third Office Action for Chinese Patent Application No. 200980110432.5, dated Mar. 31, 2014.

US Notice of Allowance for U.S. Appl. No. 12/359,982, dated Jul. 21, 2014.

US Notice of Allowance for U.S. Appl. No. 12/359,998 dated Oct. 22, 2013.

US Notice of Allowance for U.S. Appl. No. 14/539,681, dated Jan. 13, 2017.

US Notice of Allowance for U.S. Appl. No. 14/539,681, dated Oct. 7, 2016.

US Notice of Allowance in U.S. Appl. No. 12/851,449, dated Mar. 15, 2013.

US Office Action for U.S. Appl. No. 12/359,982, dated May 9, 2014.

US Office Action for U.S. Appl. No. 12/359,982 dated Jan. 17, 2014.

US Office Action for U.S. Appl. No. 12/359,982 dated Jan. 6, 2012.

US Office Action for U.S. Appl. No. 12/359,982 dated May 22, 2012.

US Office Action for U.S. Appl. No. 12/359,998 dated Dec. 19, 2011.

US Office Action for U.S. Appl. No. 12/359,998 dated Jun. 13, 2012.

US Office Action for U.S. Appl. No. 12/359,998 dated Jun. 13, 2013.

US Office Action for US Appl. No. 14/175,616, dated Jul. 31, 2017.

US Office Action for U.S. Appl. No. 14/175,616, dated Mar. 21, 2017.

US Office Action for U.S. Appl. No. 14/175,616, dated Nov. 9, 2016.

US Office Action for U.S. Appl. No. 14/539,681, dated May 10, 2016.

US Office Action in U.S. Appl. No. 12/851,449, dated Oct. 15, 2012.

Notice of Allowance for U.S. Appl. No. 15/482,423, dated Mar. 13, 2020.

Final Office Action for U.S. Appl. No. 15/482,423, dated Jan. 31, 2020.

* cited by examiner

ANCHORED MATCH ALGORITHM FOR MATCHING WITH LARGE SETS OF URL

FIELD OF THE DISCLOSURE

The present application generally relates to multi-pattern string matching algorithms. In particular, the present application relates to systems and methods for matching with indexed Uniform Resource Locator (URL) pattern sets.

BACKGROUND OF THE DISCLOSURE

Multi-pattern string matching algorithms may be used to find patterns from text. Current multi-pattern string matching algorithms, such as the Wu-Manber (WM) and Aho-Corasick algorithms, may exhibit poor performance when comparing text to a multitude of patterns if greater than $10^4$ patterns.

BRIEF SUMMARY OF THE DISCLOSURE

The present disclosure is directed towards systems and methods for matching with indexed Uniform Resource Locator (URL) pattern sets. Multi-pattern string matching algorithms may be used in a wide variety of applications, such as intrusion detection, access control, and data mining. Current string matching algorithms, however, may undergo significant performance issues when matching against a large number of patterns. In Aho-Corasick algorithms, a finite state machine may be constructed with each node representing a single character and paths between the nodes representing recognized pattern strings. This algorithm, however, may be unsuitable with lengthy strings, as the complexity of constructing and searching through the dictionary data structure increases linearly. With Wu-Manber algorithms, three table data structures (known as a shift table, a hash table, and a prefix table) may be created to catalogue strings. One of these tables, the shift table, may specify a maximum number of the shift for matching window calculated from a first subset of characters in each string pattern. The smaller the shift in the string pattern (such as with URLs), the less efficient the algorithm may be. As such, the Wu-Manber algorithms may be limited in the number of string patterns may be catalogued. Both of these algorithms may exhibit degraded performance in computing time and resource consumption for large datasets of string patterns.

By exploiting the internal structure and statistical distributions of Universal Resource Locators (URLs), the present systems and method s may provide a multi-pattern string matching algorithm for supporting large sets of patterns. Any given URL may include multiple components: a protocol, a hostname, a file pathname, and parameters (e.g., document anchors and user authentication information). In processing each URL, the protocol and the parameters may be ignored, as these components may be specific to a particular user or may not be relevant in subsequent applications. Within the hostname of each URL, there may be a finite set of top level domains (e.g., ".com," ".co.uk," and ".edu", etc.). In addition, the hostname may start with various subdomains (e.g., "www." or "mail.", etc.) at a sub-organizational level. The most relevant or significant part of the hostname in the URL may be at the organizational level (e.g., "company.com" in "www.company.com/index.html").

With knowledge of the structure of URLs, a map and chain data structure may be generated to represent a list of URL pattern sets. The map may index each URL by the significant part of the hostname. Each entry in the map may point to a chain. The chain may hold a list of URLs that share the common significant hostname. Each entry in the chain may contain information to quickly filter out matches by comparing path lengths. In this manner, relative to present multi-pattern string matching algorithms, the present systems and methods may support larger datasets of string patterns (greater than $10^6$), while increasing the computing efficiency of the matching of pattern sets.

To index each URL pattern set into the map and chain data structure, a computing device may identify an anchor of the URL. The anchor may correspond to a position of the first slash that separates a hostname and a pathname in the URL. Then, the computing device may determine a path suffix of the URL corresponding to a position of the last character in the URL. For example, in the URL "www.abc.com/index.html", the anchor may be 12 and the path suffix may be 22. The computing device may then determine a host prefix. The host prefix may be the number of the most significant characters in the hostname for the purposes of indexing. In determining the host prefix, the computing device may search a list of top level domains for a longest possible suffix match with the hostname of the URL. Having found the match, the computing device may set the host prefix to include the top level domain and one additional subdomain to the left. For example, in the URL "www.example.com/", the top level domain may be ".com" and the host prefix may be "example.com." The computing device may also identify a number of characters as from the anchor to the subdomain to the left of the top level domain (e.g., the number of characters for the host prefix in the URL "www.abc. com/index.html" may be 7).

Having determined the various components of the URL, the computing device may create a pattern entry for adding to the map data structure. The pattern entry may include the URL, the anchor, the host prefix, the path suffix, a prefix (part of the URL left of the anchor), and a suffix (part of the URL right of the anchor), among other information. The computing device may then calculate a hash value using the characters forming the host prefix. Using the calculated hash value, the computing device may search the map for a bucket indexed by the hash value. Each bucket may include a list of pattern entries (referred to as the chain). If there is no bucket, the computing device may create a bucket and insert the bucket into the map indexed by the hash value. If there is a bucket found, the computing device may add the pattern to the bucket found.

With the construction of the map and chain data structure, URLs may be matched against the patterns of the map. For a new URL to be matched, the computing device may determine the hash value of the host prefix and identify the anchor, the host prefix, the path suffix, the prefix, and the suffix to generate a new pattern, as described above. The computing device may then search for a match using the new pattern. The computing device may determine whether the newly calculated hash value match any of the hash values indexing the buckets in the map. If there is no match between the new hash value and any of the hash values of the map, there may be no bucket associated with the hash value and the computing device may determine there is no match between the new URL and any of the URLs catalogued in the map. Conversely, if there is a match between the hash values, the computing device may identify the bucket and traverse the pattern entries forming the chain of the identified bucket to compare various components of the pattern entry from the map with the new pattern entry to be matched.

The prefix of the new pattern entry may be checked against the prefixes of the pattern entries catalogued in the chain. The computing device may compare a length of the prefix of the pattern entry with a length of the prefix of the new pattern. If the length of the prefix of the pattern entry is longer, the computing device may identify the next pattern entry in the chain, as a prefix of the pattern with a longer length may not match a prefix of a new pattern with a shorter length. If the length of the prefix of the pattern entry is shorter or equal to the length of the prefix of the new pattern entry, the computing device may determine whether the prefix of the pattern entry ends with the prefix of the new pattern entry. If the last subset of characters in the prefix of the pattern entry does not end with the prefix of the new pattern entry, the computing device may identify the next pattern entry in the chain. Also, if the length of the prefix is shorter, the computing device may determine whether the prefix of the pattern is a period (".").

The suffix of the new pattern may also be compared with the suffixes of the pattern entries of the chain. The computing device may determine whether the suffix of the pattern entry ends with a slash ("/"). If the suffix of the pattern entry ends with a slash, the computing device may determine whether the suffix of the pattern entry matches the suffix of the new pattern entry. If the suffixes do not match, the computing device may identify the next pattern entry in the chain. On the other hand, if the suffix of the pattern entry does not end with a slash, the computing device may identify the next pattern entry in the chain. Otherwise, the computing device may compare whether the suffix of the pattern entry matches with the suffix of the new pattern entry. If the two suffixes match, the computing device may determine that the new pattern entry matches one of the pattern entries.

This process of comparing the prefixes and suffixes of the pattern entries of the bucket with those of the new pattern entry from the new URL to be matched may be repeated until there are no more pattern entries in the bucket. If there are no more pattern entries in the bucket, the computing device may determine that the new pattern entry does not match any of the pattern entries in the map. By using the structure of URLs to populate a map and chain data structure indexed using hash values, the present systems and methods may allow for a greater number of patterns to be used (at least by two orders of magnitude) in checking new URLs against, without degrading the performance of the computer.

At least one aspect of this disclosure is directed to a method of matching with indexed Uniform Resource Locator (URL) pattern sets. A device may establish a hash map of patterns. Each pattern may include a suffix of a uniform resource locator (URL) and indexed by a hash of a host prefix of the URL. The hash map of patterns may include a first hash of a first host prefix of a first URL. The device may identify a second URL to perform a match against the hash map of patterns. The second URL may include a second host prefix and a second suffix. The device may calculate a second hash of the second host prefix of the second URL. The device may determine that the second hash matches an index of the first hash of the hash map of patterns. The device may identify, responsive to the determination, a match between a first suffix of the first URL in the hash map of patterns and the second suffix of the second URL. The device may apply a policy using the second URL based on the identification of the match between the first suffix of the first URL and the second suffix of the second URL.

In some embodiments, establishing the hash map of pattern may include identifying the first URL to index into the hash map of patterns. The first URL may have a plurality of characters referencing an online resource. In some embodiments, establishing the hash map of pattern may include identifying an anchor in the first URL corresponding to a first position of a separator between a hostname and a file pathname in the first URL. In some embodiments, establishing the hash map of pattern may include identifying a host prefix in the first URL corresponding to a subset of characters prior to the anchor in the first URL. In some embodiments, establishing the hash map of pattern may include calculating the first hash from a subset of characters of the host prefix. In some embodiments, establishing the hash map of pattern may include adding the pattern for the first URL into the hash map indexed by the first hash.

In some embodiments, adding the pattern into the hash map of patterns may include determining that a bucket for the first hash does not exist in the hash map of patterns based on a plurality of hashes indexed on the hash map of patterns. In some embodiments, adding the pattern into the hash map of patterns may include inserting, responsive to determining that the bucket for the first hash does not exist, the bucket indexed by the first hash into the hash map of patterns. In some embodiments, adding the pattern into the hash map of patterns may include adding the pattern into the bucket of the hash map of patterns for the first hash.

In some embodiments, adding the pattern into the hash map of patterns may include determining that a bucket for the first hash exists in the hash map of patterns based on a plurality of hashes indexed on the hash map of patterns. In some embodiments, adding the pattern into the hash map of patterns may include identifying the bucket associated with the first hash on the hash map of patterns. In some embodiments, adding the pattern into the hash map of patterns may adding the pattern into the bucket of the hash map of pattern associated with the first hash.

In some embodiments, establishing the hash map of pattern may include generating the pattern to insert into the hash map of patterns. The pattern may include the first URL, an anchor corresponding to a position of a separator between a hostname and a file pathname in the first URL, a host prefix corresponding to a number of characters between the anchor and a host of the first URL, a path suffix corresponding to a first subset of characters subsequent to the anchor, a prefix corresponding to a second subset of characters prior to the anchor, and a suffix corresponding to a third subset of characters subsequent to the anchor.

In some embodiments, calculating the second hash of the second host prefix of the second URL may include identifying an anchor in the second URL corresponding to a first position of a separator between a hostname and a file pathname in the second URL. In some embodiments, calculating the second hash of the second host prefix of the second URL may include identifying a host prefix in the first URL corresponding to a subset of characters prior to the anchor in the first URL. In some embodiments, calculating the second hash of the second host prefix of the second URL may include calculating the second hash from the subset of characters corresponding to the host prefix.

In some embodiments, identifying the match may include determining that a bucket for the first hash exists in the hash map of patterns based on a plurality of hashes indexed on the hash map of patterns. In some embodiments, identifying the match may include identifying a first length of a first prefix corresponding to a first subset of characters in the first URL prior to a first separator between a first hostname and a first file pathname. In some embodiments, identifying the match may include identifying a second length of a second prefix corresponding to a second subset of characters in the second URL prior to a second separator between a second hostname and a second file pathname. In some embodiments, identifying the match may include determining that the first length of the first prefix is greater than or equal to the second length of the second prefix.

In some embodiments, identifying the match may include identifying a first prefix corresponding to a first subset of characters in the first URL prior to a first separator between a first hostname and a first file pathname. In some embodiments, identifying the match may include identifying a second prefix corresponding to a second subset of characters in the second URL prior to a second separator between a second hostname and a second file pathname. In some embodiments, identifying the match may include determining that a terminal subset of characters for the first prefix matches the second prefix.

In some embodiments, identifying the match may include determining that a terminal character of the first suffix for the first URL includes a predetermined character. In some embodiments, identifying the match may include determining, responsive to determining that the terminal character of the first suffix includes the predetermined character, that the first suffix for the first URL matches the second suffix for the second URL. In some embodiments, applying the policy may include applying the policy including at least one of adding the second URL onto a whitelist, adding the second URL onto a blacklist, controlling access of an online resource referenced by the second URL, or generating an alert prompt for intrusion detection.

Another aspect of this disclosure is directed to a system for matching with indexed Uniform Resource Locator (URL) pattern sets. The system may include a pattern indexer executable on a processor. The processor may be coupled to memory of a computing device. The pattern indexer may establish a hash map of pattern. Each pattern may include a suffix of a uniform resource locator (URL) and may be indexed by a hash of a host prefix of the URL. The hash map of patterns may include a first hash of a first host prefix of a first URL. A pattern matcher of the computing device may identify a second URL to perform a match against the hash map of patterns. The second URL may include a second host prefix and a second suffix. The pattern matcher may calculate a second hash of the second host prefix of the second URL. The pattern matcher may determine that the second hash matches an index of the first hash of the hash map of patterns. The pattern matcher may identify, responsive to the determination, a match between a first suffix of the first URL in the hash map of patterns and the second suffix of the second URL. A policy manager of the computing device may apply a policy using the second URL based on the identification of the match between the first suffix of the first URL and the second suffix of the second URL.

In some embodiments, the pattern indexer may establish hash map of pattern for each pattern by identifying the first URL to index into the hash map of patterns, the first URL having a plurality of characters referencing an online resource. In some embodiments, the pattern indexer may establish hash map of pattern for each pattern by identifying an anchor in the first URL corresponding to a first position of a separator between a hostname and a file pathname in the first URL. In some embodiments, the pattern indexer may establish hash map of pattern for each pattern by identifying a host in the first URL corresponding to a second position of a top level domain in the hostname of the first URL. In some embodiments, the pattern indexer may establish hash map of pattern for each pattern by a host prefix in the first URL corresponding to a subset of characters prior to the anchor in the first URL. In some embodiments, the pattern indexer may establish hash map of pattern for each pattern by calculating the first hash from a subset of characters between the host prefix and the anchor in the plurality of characters for the first URL. In some embodiments, the pattern indexer may establish hash map of pattern for each pattern by adding the pattern for the first URL into the hash map indexed by the first hash.

In some embodiments, the pattern indexer may establish hash map of pattern for each pattern by determining that a bucket for the first hash does not exist in the hash map of patterns based on a plurality of hashes indexed on the hash map of patterns. In some embodiments, the pattern indexer may establish hash map of pattern for each pattern by inserting, responsive to determining that the bucket for the first hash does not exist, the bucket indexed by the first hash into the hash map of patterns. In some embodiments, the pattern indexer may establish hash map of pattern for each pattern by adding the pattern into the bucket of the hash map of patterns for the first hash.

In some embodiments, the pattern indexer may establish hash map of pattern for each pattern by determining that a bucket for the first hash exists in the hash map of patterns based on a plurality of hashes indexed on the hash map of patterns. In some embodiments, the pattern indexer may establish hash map of pattern for each pattern by identifying the bucket associated with the first hash on the hash map of patterns. In some embodiments, the pattern indexer may establish hash map of pattern for each pattern by adding the pattern into the bucket of the hash map of pattern associated with the first hash.

In some embodiments, the pattern may include the first URL, an anchor corresponding to a position of a separator between a hostname and a file pathname in the first URL, a host prefix corresponding to a number of characters between the anchor and a host of the first URL, a path suffix corresponding to a first subset of characters subsequent to the anchor, a prefix corresponding to a second subset of characters prior to the anchor, and a suffix corresponding to a third subset of characters subsequent to the anchor.

In some embodiments, the pattern matcher may identify an anchor in the second URL corresponding to a first position of a separator between a hostname and a file pathname in the second URL. In some embodiments, the pattern matcher may identify a host in the second URL corresponding to a second position of a top level domain in the hostname of the second URL. In some embodiments, the pattern matcher may determine the host prefix corresponding to a number of characters between the first position and the second position. In some embodiments, the pattern matcher may calculate the second hash from the subset of characters corresponding to the host prefix.

In some embodiments, the pattern matcher may identify the match by determining that a bucket for the first hash exists in the hash map of patterns based on a plurality of hashes indexed on the hash map of patterns. In some embodiments, the pattern matcher may identify the match by identifying a first length of a first prefix corresponding to a first subset of characters in the first URL prior to a first separator between a first hostname and a first file pathname. In some embodiments, the pattern matcher may identify the match by identifying a second length of a second prefix corresponding to a second subset of characters in the second URL prior to a second separator between a second hostname and a second file pathname. In some embodiments, the pattern matcher may identify the match by determining that the first length of the first prefix is greater than or equal to the second length of the second prefix.

In some embodiments, the pattern matcher may identify the match by identifying a first prefix corresponding to a first subset of characters in the first URL prior to a first separator between a first hostname and a first file pathname. In some embodiments, the pattern matcher may identify the match by identifying a second prefix corresponding to a second subset of characters in the second URL prior to a second separator between a second hostname and a second file pathname. In some embodiments, the pattern matcher may identify the match by determining that a terminal subset of characters for the first prefix matches the second prefix.

In some embodiments, the pattern matcher may identify the match by identifying a first prefix corresponding to a first subset of characters in the first URL prior to a first separator between a first hostname and a first file pathname. In some embodiments, the pattern matcher may identify the match by identifying a second prefix corresponding to a second subset of characters in the second URL prior to a second separator between a second hostname and a second file pathname. In some embodiments, the pattern matcher may identify the match by determining that a terminal subset of characters for the first prefix matches the second prefix.

In some embodiments, the pattern matcher may identify the match by determining that a terminal character of the first suffix for the first URL includes a predetermined character. In some embodiments, the pattern matcher may identify the match by determining, responsive to determining that the terminal character of the first suffix includes the predetermined character, that the first suffix for the first URL matches the second suffix for the second URL. In some embodiments, the policy may include at least one of adding the second URL onto a whitelist, adding the second URL onto a blacklist, blocking access of an online resource referenced by the second URL, or generating an alert prompt for intrusion detection.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
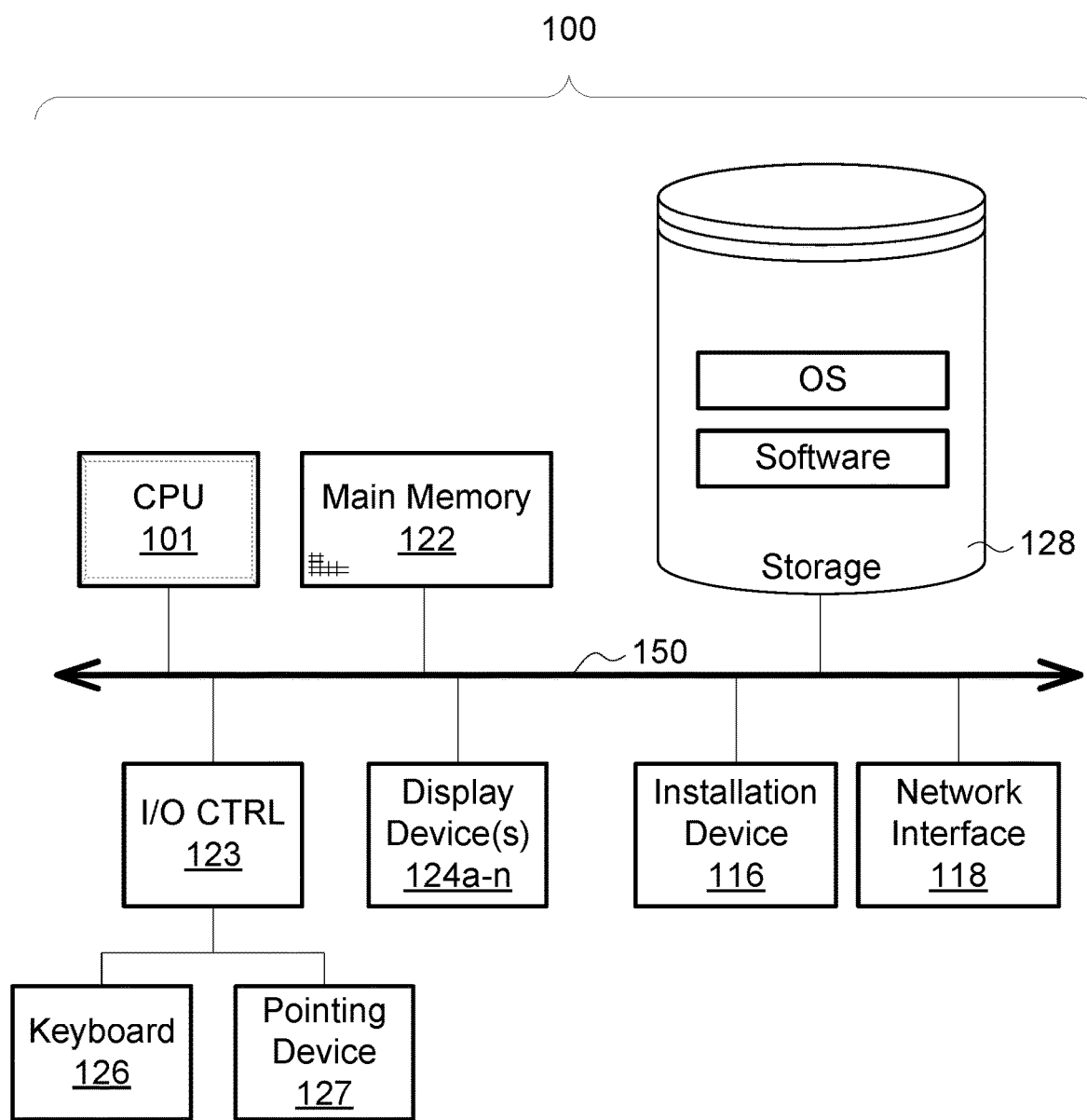
FIGS. 1A-1D are block diagrams of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for matching with indexed Uniform Resource Locator (URL) pattern sets.

A. Computing Environment

Figure 1B:
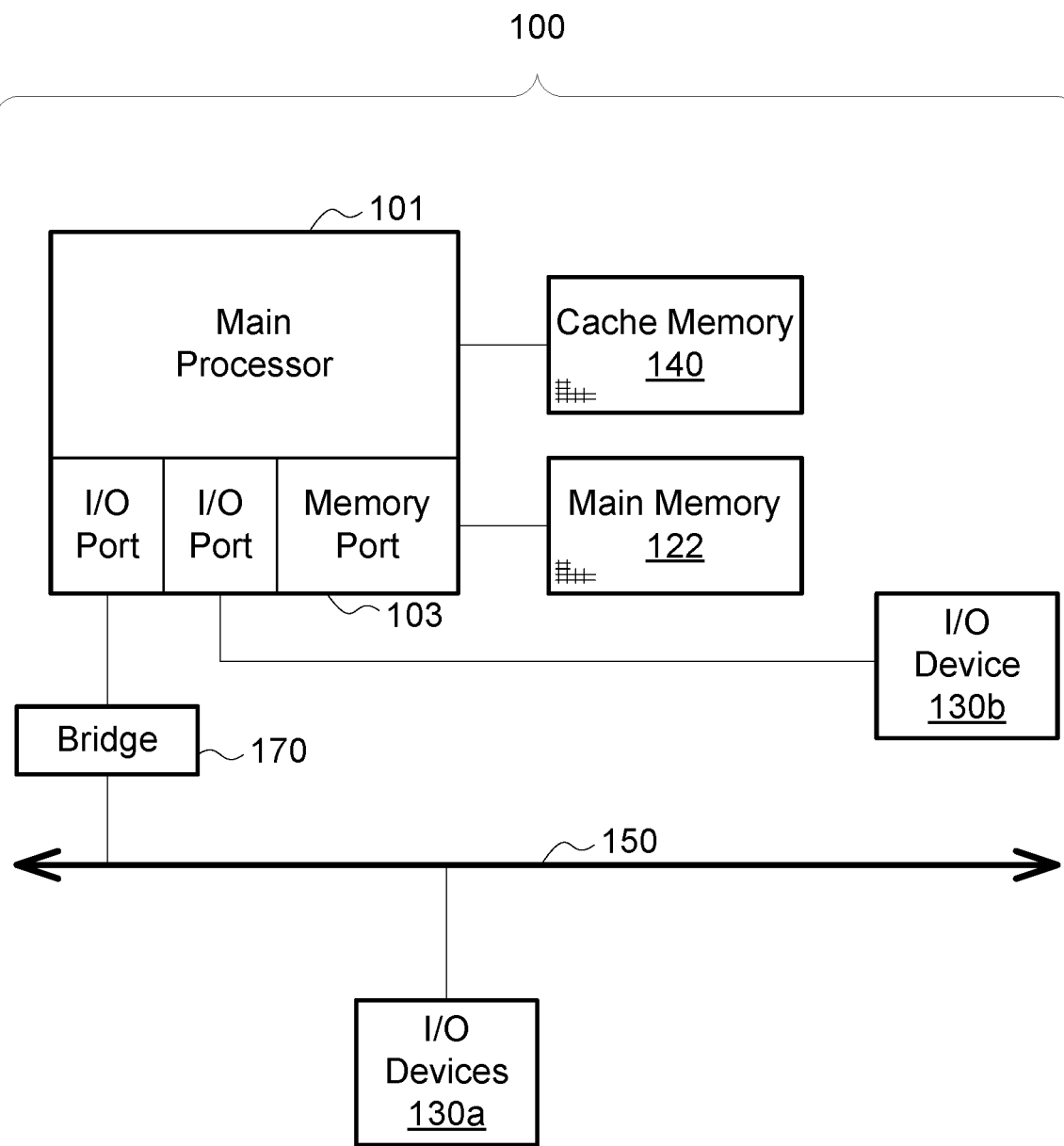

Prior to discussing the specifics of embodiments of the systems and methods of an appliance and/or client, it may be helpful to discuss the computing environments in which such embodiments may be deployed. FIGS. 1A and 1B depict block diagrams of a computing device 100 useful for practicing embodiments of the systems and devices described further below in Section B. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Samsung Electronics of Suwon, Korea; those manufactured by Micron Technology of Boise, Id.; those manufactured by Transmeta Corporation of Santa Clara, Calif.; those manufactured by International Business Machines of White Plains, N.Y.; or those manufactured by Advanced Micro Devices of Sunnyvale, Calif., among others. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a CD-ROM drive, a CD-R/RW drive, a DVD-ROM drive, tape drives of various formats, USB device, hard-drive or any other device suitable for installing software and programs. The computing device 100 may further comprise a storage device 128, such as one or more hard disk drives or redundant arrays of independent disks, for storing an operating system and other related software, and for storing application software programs. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. or SanDisk Corporation of Milpitas, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 may be a smartphone or a tablet, such as those developed by Apple Inc., by Samsung Electronics, by Xiaomi. Inc., or by Google Inc., among others. In this embodiment, the smartphone or tablet may be operated under the control of an operating system (such as Android or iOS) and may include a stylus input device as well as a touch sensitive screen. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1C:
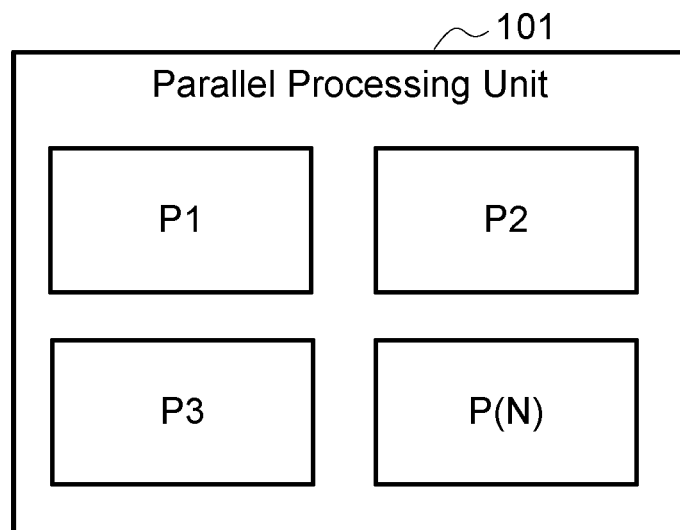

As shown in FIG. 1C, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a Cell Broadband Engine architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1D:
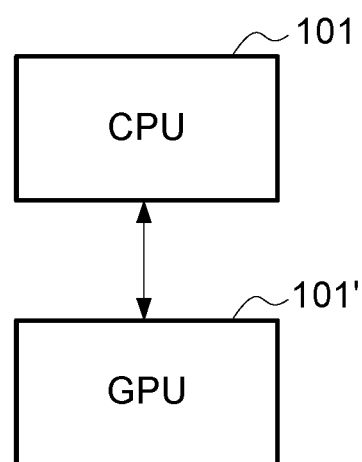

In some embodiments, the computing device 100 may comprise a graphics processing unit. In one of these embodiments depicted in FIG. 1D, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Systems and Methods for Matching with Indexed Uniform Resource Locator (URL) Pattern Sets The present disclosure is directed towards systems and methods for matching with indexed Uniform Resource Locator (URL) pattern sets. Multi-pattern string matching algorithms may be used in a wide variety of applications, such as intrusion detection, access control, and data mining. Current string matching algorithms, however, may undergo significant performance issues when matching against a large number of patterns. In Aho-Corasick algorithms, a finite state machine may be constructed with each node representing a single character and paths between the nodes representing recognized pattern strings. This algorithm, however, may be unsuitable with lengthy strings, as the complexity of constructing and searching through the dictionary data structure increases linearly. With Wu-Manber algorithms, three table data structures (known as a shift table, a hash table, and a prefix table) may be created to catalogue strings. One of these tables, the shift table, may specify a maximum number of the shift for matching window calculated from a first subset of characters in each string pattern. The smaller the shift in the string pattern (such as with URLs), the less efficient the algorithm may be. As such, the Wu-Manber algorithms may be limited in the number of string patterns may be catalogued. Both of these algorithms may exhibit degraded performance in computing time and resource consumption for large datasets of string patterns.

By exploiting the internal structure and statistical distributions of Universal Resource Locators (URLs), the present systems and method s may provide a multi-pattern string matching algorithm for supporting large sets of patterns. Any given URL may include multiple components: a protocol, a hostname, a file pathname, and parameters (e.g., document anchors and user authentication information). In processing each URL, the protocol and the parameters may be ignored, as these components may be specific to a particular user or may not be relevant in subsequent applications. Within the hostname of each URL, there may be a finite set of top level domains (e.g., ".com," ".co.uk," and ".edu", etc.). In addition, the hostname may start with various subdomains (e.g., "www." or "mail.", etc.) at a sub-organizational level. The most relevant or significant part of the hostname in the URL may be at the organizational level (e.g., "company.com" in "www.company.com/index.html").

With knowledge of the structure of URLs, a map and chain data structure may be generated to represent a list of URL pattern sets. The map may index each URL by the significant part of the hostname. Each entry in the map may point to a chain. The chain may hold a list of URLs that share the common significant hostname. Each entry in the chain may contain information to quickly filter out matches by comparing path lengths. In this manner, relative to present multi-pattern string matching algorithms, the present systems and methods may support larger datasets of string patterns (greater than $10^6$), while increasing the computing efficiency of the matching of pattern sets.

To index each URL pattern set into the map and chain data structure, a computing device may identify an anchor of the URL. The anchor may correspond to a position of the first slash that separates a hostname and a pathname in the URL. Then, the computing device may determine a path suffix of the URL corresponding to a position of the last character in the URL. For example, in the URL "www.abc.com/index- .html", the anchor may be 12 and the path suffix may be 22. The computing device may then determine a host prefix. The host prefix may be the number of the most significant characters in the hostname for the purposes of indexing. In determining the host prefix, the computing device may search a list of top level domains for a longest possible suffix match with the hostname of the URL. Having found the match, the computing device may set the host prefix to include the top level domain and one additional subdomain to the left. For example, in the URL "www.example.com/", the top level domain may be ".com" and the host prefix may be "example.com." The computing device may also identify a number of characters as from the anchor to the subdomain to the left of the top level domain (e.g., the number of characters for the host prefix in the URL "www.abc. com/ index.html" may be 7).

Having determined the various components of the URL, the computing device may create a pattern entry for adding to the map data structure. The pattern entry may include the URL, the anchor, the host prefix, the path suffix, a prefix (part of the URL left of the anchor), and a suffix (part of the URL right of the anchor), among other information. The computing device may then calculate a hash value using the characters forming the host prefix. Using the calculated hash value, the computing device may search the map for a bucket indexed by the hash value. Each bucket may include a list of pattern entries (referred to as the chain). If there is no bucket, the computing device may create a bucket and insert the bucket into the map indexed by the hash value. If there is a bucket found, the computing device may add the pattern to the bucket found.

With the construction of the map and chain data structure, URLs may be matched against the patterns of the map. For a new URL to be matched, the computing device may determine the hash value of the host prefix and identify the anchor, the host prefix, the path suffix, the prefix, and the suffix to generate a new pattern, as described above. The computing device may then search for a match using the new pattern. The computing device may determine whether the newly calculated hash value match any of the hash values indexing the buckets in the map. If there is no match between the new hash value and any of the hash values of the map, there may be no bucket associated with the hash value and the computing device may determine there is no match between the new URL and any of the URLs catalogued in the map. Conversely, if there is a match between the hash values, the computing device may identify the bucket and traverse the pattern entries forming the chain of the identified bucket to compare various components of the pattern entry from the map with the new pattern entry to be matched.

The prefix of the new pattern entry may be checked against the prefixes of the pattern entries catalogued in the chain. The computing device may compare a length of the prefix of the pattern entry with a length of the prefix of the new pattern. If the length of the prefix of the pattern entry is longer, the computing device may identify the next pattern entry in the chain, as a prefix of the pattern with a longer length may not match a prefix of a new pattern with a shorter length. If the length of the prefix of the pattern entry is shorter or equal to the length of the prefix of the new pattern entry, the computing device may determine whether the prefix of the pattern entry ends with the prefix of the new pattern entry. If the last subset of characters in the prefix of the pattern entry does not end with the prefix of the new pattern entry, the computing device may identify the next pattern entry in the chain. Also, if the length of the prefix is shorter, the computing device may determine whether the prefix of the pattern is a period (".").

The suffix of the new pattern may also be compared with the suffixes of the pattern entries of the chain. The computing device may determine whether the suffix of the pattern entry ends with a slash ("/"). If the suffix of the pattern entry ends with a slash, the computing device may determine whether the suffix of the pattern entry matches the suffix of the new pattern entry. If the suffixes do not match, the computing device may identify the next pattern entry in the chain. On the other hand, if the suffix of the pattern entry does not end with a slash, the computing device may identify the next pattern entry in the chain. Otherwise, the computing device may compare whether the suffix of the pattern entry matches with the suffix of the new pattern entry. If the two suffixes match, the computing device may determine that the new pattern entry matches one of the pattern entries.

This process of comparing the prefixes and suffixes of the pattern entries of the bucket with those of the new pattern entry from the new URL to be matched may be repeated until there are no more pattern entries in the bucket. If there are no more pattern entries in the bucket, the computing device may determine that the new pattern entry does not match any of the pattern entries in the map. By using the structure of URLs to populate a map and chain data structure indexed using hash values, the present systems and methods may allow for a greater number of patterns to be used (at least by two orders of magnitude) in checking new URLs against, without degrading the performance of the computer.

Figure 2:
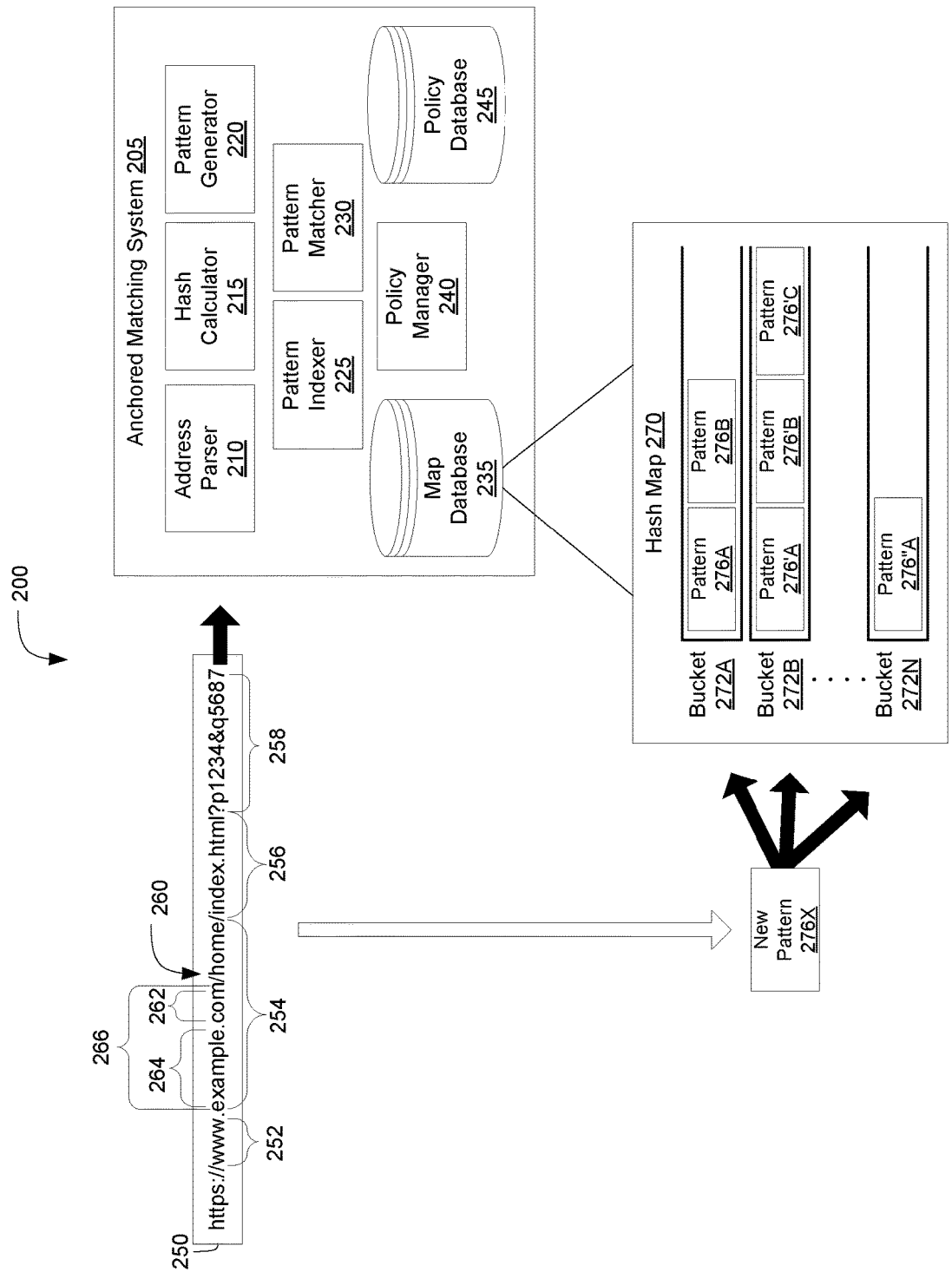
FIG. 2 is a block diagram of an embodiment of a system for matching with indexed Uniform Resource Locator (URL) pattern sets.

Referring now to FIG. 2, depicted is a block diagram of an embodiment of a system 200 for transferring a file to a mobile device via scanning quick response codes displayed via a display output device. The system 200 may include an anchored matching system 205 connected to a computer network environment. The anchored matching system 205 may include an address parser 210, a hash calculator 215, a pattern generator 220, a pattern indexer 225, a pattern matcher 230, a map database 235, a policy manager 240, and a policy database 245, among others. In some embodiments, the pattern indexer 225 can include the functionalities of the address parser 210, the hash calculator 215, and the pattern generator 230. In some embodiments, the pattern matcher 230 can include the functionalities of the address parser 210, the hash calculator 215, and the pattern generator 220. In some embodiments, the policy manager 235 and the policy database 240 may be separate from the anchored matching system 205 (e.g., executed on another computing device connected to the network environment).

Each of the above-mentioned elements or entities is implemented in hardware, or a combination of hardware and software, in one or more embodiments. Each component of the system 200a may be implemented using hardware or a combination of hardware or software detailed above in connection with FIGS. 1A-1D. For instance, each of these elements or entities can include any application, program, library, script, task, service, process or any type and form of executable instructions executing on hardware of the file server 205, the media device 215, the client 220, and the file database 210s. The hardware includes circuitry such as one or more processors in one or more embodiments.

In overview, each URL 250 processed by the anchored matching system 205 in two manners. The URL 250 may be catalogued by the pattern indexer 220 into a hash map 270 of patterns 276A-N maintained at the map database 230. The URL 250 may also be checked against the hash map 270 of the map database 230 by the pattern matcher 225. In both routes, various components of the URL 250 may be parsed by the address parser 210. The hash calculator 215 may then calculate a hash value from at least one of the components parsed from the URL 250. Using the URL 250 parsed into various components, the pattern generator 220 may create a new pattern entry. The new pattern entry may be added by the pattern indexer 225 to the hash map 270 using the calculated hash value. Additionally, the new pattern entry and the associated hash value may be checked against the hash map 270 by the pattern matcher 230. Depending on whether there is a match between the URL 250 and any previously catalogued on the map database 230, the policy manager 240 may apply a policy. The functionalities of each component of the anchored matching system 205 are detailed below.

The address parser 210 may identify a URL 250 to be catalogued by the pattern indexer 225 or to match against the hash map 270. In some embodiments, the address parser 210 may receive the URL 250 as part of a request. The request may include an indicator specifying whether the anchor matching system 205 is to catalogue the URL 250 into the hash map 270 or is to match the URL 250 against the hash map 270 maintained at the map database 235. In some embodiments, the address parser 210 may parse the request to identify the URL 250 and to identify the indicator. In some embodiments, the address parser 210 may receive or intercept the URL 250 as part of a header of a HTTP message, such as a request from a client to a server or a response from the server to the client. The address parser 210 may parse the HTTP message to identify the header and may parse the header to identify the URL 250.

Once the URL 250 is identified, the address parser 210 may parse the URL 250 to identify one or more constituent components. The URL 250 may include a set of characters that may reference an online resource (e.g., a web-based application, a webpage, etc.). The URL 250 may include a protocol 252, a hostname 254, a file pathname 256, and a query string 258, among others, interspersed by separators such as slashes ("/"), periods ("."), question marks ("?"), and ampersands ("&"). The protocol 252 (sometimes referred to as a scheme) may specify which communications protocol is to be used (e.g., ftp, http, or https, etc.). The hostname 254 may specify a domain name of a server hosting the online resource. The domain name may include one or more subdomains (e.g., "www", "example", and ".com" as depicted in FIG. 2). The file pathname 256 may specify a hierarchical directory and filename of the specific online resource. The query string 258 may specify additional information besides the reference to the online resource (e.g., an attribute-value pair used as an input parameter for the online resource). In the example depicted in FIG. 2, the protocol 252 is "https," the hostname 254 is "www.example.com," the file pathname 256 is "/home/index.html," and the query string 258 is "?p1234&q5678."

The address parser 210 may traverse through the set of characters forming the URL 250 to identify the one or more constituent components, such as the protocol 252, the hostname 254, the file pathname 256, and the query string 258. In traversing through the characters of the URL 250, the address parser 210 may identify components relevant for the purposes of cataloging or matching. The address parser 210 may identify the hostname 254 and the file pathname 256 as relevant and may maintain the hostname 254 and the file pathname 256 in the URL 250. On the other hand, the address parser 210 may remove a subset of the components of the URL 250 that may be not relevant for the purposes of cataloging or matching. The address parser 210 may remove as the protocol 252 from the URL 250, the protocol 252 is likely to be similar across various URLs 250. The address parser 210 may also remove the query string 258, as the query string 258 is highly variant across various URLs 250 referencing the same online resource.

With the components of the URL 250 identified, the address parser 210 may identify various parameters to be used for cataloging or matching against the hash map 270. The address parser 210 may identify an anchor 260 in the URL 250. In some embodiments, the address parser 210 may identify the separator between the hostname 254 and the file pathname 256. The anchor 260 may correspond to a position of a separator (e.g., slash) between the hostname 254 and the file pathname 256. The position of the separator may be an index value (e.g., Integer) of the slash in the URL 250. In some embodiments, the position may be the index value of the slash in the URL 250 with the non-relevant components removed (e.g., the protocol 252 and the query string 258). In the example depicted in FIG. 2, the index value for the anchor may be 16. The address parser 210 may also identify a path suffix of the URL 250. The path suffix may correspond to the position of the last character in the URL 250. In some embodiments, the path suffix may correspond to the position of the last character in the URL 250 with the non-relevant components removed (e.g., the protocol 252 and the query string 258). In some embodiments, the position for the path suffix may be an index value or length of the URL 250 with the non-relevant components removed. In the example depicted in FIG. 2, the path suffix may be the length of the string "www.example.com/home/index.html," and may be 31.

Having identified the anchor 260 in the URL 250, the address parser 210 may identify the hostname 254 of the URL 250 left of the separator corresponding to the anchor 260. The hostname 254 may end with one of a set of top-level domains (TLDs), such ".com," ".co.uk," and ".edu," among others. In some embodiments, the address parser 210 may identify a top-level domain 262 of the URL 250. The address parser 210 may identify a set of characters in the URL 250 left of the separator corresponding to the anchor 260. In some embodiments, the address parser 210 may traverse the URL 250 decrementing from the separator corresponding to the anchor 260 until one separator (e.g., a period) to identify one set of characters (e.g., top level domain 262). In some embodiments, the address parser 210 may traverse the URL 250 decrementing from the separator corresponding to the anchor 260 until two separators (e.g., periods) to identify another set of characters (e.g., ".co.uk"). In some embodiments, the address parser 210 may compare the identified sets of characters with the characters in the set of top-level domains. In some embodiments, the address parser 210 may identify the top-level domain of the longest length matching the identified set of characters between the separators of the URL 250. In some embodiments, if there are multiple matches between the identified sets of characters and the top-level domains, the address parser 210 may identify the match of the longest length as the top-level domain 262.

Once the top-level domain 262 left of the anchor 260 is identified, the address parser 210 may identify a host prefix 266 from the URL 250. The host prefix 266 may include a subset of characters of the URL 250 that may include the top-level domain 262 and the one additional subdomain 264 of the hostname 254. In some embodiments, the address parser 210 may identify one additional subdomain 264 left of the top-level domain 262. In some embodiments, the address parser 210 may traverse the URL 250 from the leftmost character of the top-level domain 262 until one separator (e.g., a period) to identify the subdomain 264. In the example illustrated in FIG. 2, the top-level domain 262 may be ".com" and the one addition subdomain 264 left of the top-domain may be "example." As such, the host prefix 266 of the URL 250 may be "example.com." In some embodiments, the address parser 210 may determine a length of the host prefix 266. In the example depicted in FIG. 2, the length of the host prefix 266 may be 11. In some embodiments, the address parser 210 may determine a number of subdomains (e.g., "www," "example," and ".com" as depicted) in the URL 250. If the number of subdomains is less than two, the address parser 210 may use the entire hostname 254 as the host prefix 266. On the other hand, if the number of subdomains is greater than or equal to two, the address parser 210 may use the subdomain 264 and the top-level domain 262 as the host prefix 266.

In some embodiments, the address parser 210 may also identify a prefix of the URL 250. The prefix may correspond to a byte array of a subset of characters in the URL 250 corresponding to the host prefix 266. In some embodiments, the prefix may correspond to a byte array of a subset of characters in the URL 250 prior to the anchor 260, such as the hostname 254, the top-level domain 262, the subdomain 264, or the host prefix 266. The prefix may be exclusive of the anchor 260. In some embodiments, the address parser 210 may identify a suffix of the URL 250. The suffix may correspond to a byte array of a subset of characters in the URL 250 subsequent to the anchor 260, such as the file pathname 256. The suffix may be exclusive of the anchor 260.

With the identification of the host prefix 266, the hash calculator 215 may calculate a hash value of the host prefix 266. In some embodiments, the hash calculator 215 may apply a hashing function on the characters of the host prefix 266. The hashing function may be a cryptographic hash function, such as Message Digest Algorithm (MD2, MD4, MD5, or MD6, etc.), Secure Hash Algorithm (SHA-1, SHA-2,SHA-3 etc.), or a Hash-Based Message Authentication Code function (HMAC), among others. The hashing function may be a non-cryptographic hash function, such as Jenkins hashing, Zobrist hashing, and Murmurhash, among others. In some embodiments, the hash calculator 215 may parse the URL 250 to identify a subset of characters of the URL 250 corresponding to the host prefix 266. In some embodiments, the hash calculator 215 may convert each character to a binary value forming a byte array for the hash prefix 266. Upon converting all the characters of the host prefix 266, the hash calculator 215 may apply the hashing function onto the byte array to calculate the hash value for the hash prefix 266.

In conjunction, the pattern generator 220 may generate a new pattern entry 276X for the URL 250 using the various components thereof. The pattern entry 276X may be a data structure (e.g., an array, linked list, matrix, table, etc.) for keeping track of the various components of the URL 250. The pattern entry 276X may include characters of the URL 250, the anchor 260, the host prefix 266, and the path suffix, among others. In some embodiments, the pattern entry 276X may include the prefix and the suffix of the URL 250, among others. In some embodiments, the pattern entry 276X may be associated with the hash value of the host prefix 266 (e.g., as metadata or as a separate data structure). The pattern entry 276X may be used by the pattern indexer 225 to catalogue the URL 250 or by the pattern matcher 230 to match against the hash map 270.

In cataloging URLs 250, the pattern indexer 225 may establish the hash map 270 of patterns 276A-N. The hash map 270 may include one or more buckets 272A-N. Each bucket 272A-N may include one or more patterns 276A-N. Each bucket 272A-N may be associated with an index. The index may include a hash value generated by the hash calculator 215. The hash map 270 may be a data structure (e.g., an array, linked list, queue, stack, tree, matrix, table, etc.) for indexing the one or more buckets 272A-N by the hash values. Each bucket 272A-N may be a data structure (e.g., an array, linked list, queue, stack, tree, matrix, table, etc.) for containing the one or more patterns 276A-N (referred to as a chain). The pattern indexer 225 may maintain the hash map 270 in the map database 235.

The pattern indexer 225 may add the pattern entry 276X generated using the URL 250 into the hash map 270. In some embodiments, the addition of the pattern entry 276X may be responsive to a request including the indicator specifying that the anchor matching system 205 is to catalogue the URL 250 into the hash map 270. In adding the new pattern entry 276X, the pattern indexer 225 may determine whether a bucket 272A-N for the hash value calculated from the host prefix 266 of the URL 250 exists in the hash map 270. In some embodiments, the pattern indexer 225 may identify a corresponding hash value indexed for each bucket 272A-N in the hash map 270. To whether a bucket 272A-N for the hash value exists in the hash map 270, the pattern indexer 225 may then compare the hash values indexed for the buckets 272A-N with the hash value calculated using the host prefix 266 of the URL 250.

If there is a match between any of the hash values indexed for the buckets 272A-N wand the hash value calculated from the URL 250, the pattern indexer 225 may identify the bucket 272A-N corresponding to the matching hash value. The pattern indexer 225 may then add the new pattern entry 276X into the identified bucket 272A-N. In some embodiments, the pattern indexer 225 may insert the new pattern entry 276X into the identified bucket 272A-N along with the previously added pattern entries 276A-N. In some embodiments, the pattern indexer 225 may call the pattern generator 220 to instantiate the pattern entry 276X prior to insertion into the identified bucket 272A-N Conversely, if there is no match between all the hash values indexed for the buckets 272A-N in the hash map 270 and the hash value calculated from the URL 250, the pattern indexer 225 may generate a new bucket 272A-N. The new bucket 272A-N may include an index equal to the hash value calculated from the host prefix 266 of the URL 250. The pattern indexer 225 may then insert or add the bucket 272A-N into the hash map 270. In some embodiments, the pattern indexer 225 may also add the pattern entry 276X generated from the URL 250 into the new bucket 272A-N. In some embodiments, the pattern indexer 225 may call the pattern generator 220 to instantiate the pattern entry 276X prior to insertion into the newly generated bucket 272A-N.

With the calculation of the hash value and the generation of the pattern entry 276X, the pattern matcher 230 may determine whether there is a match between the URL 250 and any of the URLs indexed in the hash map 270 maintained at the map database 235. In some embodiments, the matching of the pattern entry 276X against the hash map 270 of patterns 276A-N may be responsive to a request including the indicator specifying that the anchor matching system 205 is to match the URL 250 against the hash map 270. In some embodiments, the pattern matcher 230 may whether a bucket 272A-N for the hash value calculated from the host prefix 266 of the URL 250 exists in the hash map 270. In some embodiments, the pattern indexer 225 may identify a corresponding hash value indexed for each bucket 272A-N in the hash map 270. To whether a bucket 272A-N for the hash value exists in the hash map 270, the pattern indexer 225 may then compare the hash values indexed for the buckets 272A-N with the hash value calculated using the host prefix 266 of the URL 250. If there is no match between all the hash values indexed for the buckets 272A-N in the hash map 270 and the hash value calculated from the URL 250, the pattern matcher 230 may determine that there is no match between the URL 250 and any of the URLs catalogued in the hash map 270

If there is a match between any of the hash values indexed for the buckets 272A-N wand the hash value calculated from the URL 250, the pattern matcher 230 may compare the prefix of the pattern entry 276A-N of the bucket 272A-N with the prefix of the new pattern entry 276X. The pattern matcher 230 may identify the bucket 272A-N with the matching hash value. In some embodiments, the pattern matcher 230 may identify the pattern entries 276A-N of the identified bucket 272A-N. To determine whether there is match with any of the URLs catalogued, the pattern matcher 230 may traverse through the pattern entries 276A-N of the identified bucket 272A-N. Having identified one pattern 276A-N of the identified bucket 272A-N, the pattern matcher 230 may identify a length of the prefix of the pattern entry 276A-N. The pattern matcher 230 may also identify a length of the prefix of the new pattern entry 276X. The pattern matcher 230 may compare the length of the prefix of the pattern entry 276A-N with the length of the prefix of the new pattern entry 276X. If the length of the prefix of the pattern entry 276A-N is greater than the length of the prefix of the new pattern entry 276X, the pattern matcher 230 may determine that there is no match between the URL 250 for the new pattern entry 276X and the URL used to create the catalogued pattern entry 276A-N. The pattern matcher 230 may then identify the next catalogued pattern 276A-N in the bucket 272A-N, and repeat the above described functionality.

If the length of the prefix of the pattern entry 276A-N is less than or equal to the length of the prefix of the new pattern entry 276X, the pattern matcher 230 may compare whether the prefix of the pattern entry 276A-N ends with the prefix of the new pattern entry 276X. In some embodiments, the pattern matcher 230 may traverse the characters forming the prefix of the pattern entry 276A-N and the prefix of the new pattern entry 276X from a terminal character (e.g., the rightmost character) for a predefined number of characters. The predefined number may range from 1 to a length of the prefix of the pattern entry 276A-N or the new pattern entry 276X. While traversing, the pattern matcher 230 may compare each character of the prefix of the pattern entry 276A-N with the corresponding character of the prefix of the new pattern entry 276X. If any of the characters within the predefined number does not match, the pattern matcher 230 may determine that there is no match between the URL 250 for the new pattern entry 276X and the URL used to create the catalogued pattern entry 276A-N. The pattern matcher 230 may then identify the next catalogued pattern 276A-N in the bucket 272A-N. In some embodiments, if the length of the prefix of the pattern entry 276A-N is shorter than the length of the prefix of the new pattern entry 276X, the pattern matcher 230 may determine whether the prefix or host prefix 266 of the pattern entry 276A-N ends with a period ("."). In some embodiments, the pattern matcher 230 may determine whether a terminal character (e.g., the rightmost character) of the prefix of the catalogued pattern 276A-N ends with the period. If the prefix of the pattern entry 276A-N does not end with the period, the pattern matcher 230 may determine that there is no match between the URL 250 for the new pattern entry 276X and the URL used to create the catalogued pattern entry 276A-N. The pattern matcher 230 may then identify the next catalogued pattern 276A-N in the bucket 272A-N, and repeat the above described functionality.

If the prefix of the pattern entry 276A-N matches the prefix of the new pattern entry 276X, the pattern matcher 230 may compare the suffix of the pattern entry 276A-N of the bucket 272A-N with the suffix of the new pattern entry 276X. In some embodiments, the pattern matcher 230 may identify the suffix of the pattern entry 276A-N and the suffix of the new pattern entry 276X. The pattern matcher 230 may determine whether the suffix of the pattern entry 276A-N ends with a predetermined character (e.g., a slash ("/")). In some embodiments, the pattern matcher 230 may determine whether a terminal character (e.g., the rightmost character) of the suffix of the pattern entry 276A-N ends with the predetermined character. In some embodiments, the pattern matcher 230 may determine whether the suffix of the pattern entry 276A-N If the suffix of the pattern entry 276A-N ends with the predetermined character, the pattern matcher 230 may determine whether the suffix of the pattern entry 276A-N starts with the suffix of the new pattern entry 276X. The match may be character-by-character or bit-by-bit. In some embodiments, the pattern matcher 230 may traverse through a set of characters corresponding to the suffix of the pattern entry 276A-N and through a set of characters corresponding to the suffix of the new pattern entry 276X for a predefined number of characters. The predefined number of characters may range from 0 to one less than the length of the suffix of either the new pattern entry 276X or the pattern entry 276A-N. In traversing through the characters, the pattern matcher 230 may compare each character of the suffix of the pattern entry 276A-N with a corresponding character of the suffix of the new pattern entry 276X. If all the characters match for the predefined number of characters, the pattern matcher 230 may determine that the URL 250 used to generate the new pattern entry 276x matches at least one URL used to create the catalogued pattern entry 276A-N in the hash map 270. Otherwise, if at least one character does not match within the predefined number of characters, the pattern matcher 230 may determine that there is no match between the URL 250 for the new pattern entry 276X and the URL used to create the catalogued pattern entry 276A-N. The pattern matcher 230 may then identify the next catalogued pattern 276A-N in the bucket 272A-N, and repeat the above described functionality.

On the other hand, if the suffix of the pattern entry 276A-N does not with the predetermined character, the pattern matcher 230 may determine whether the suffix of the pattern entry 276A-N matches the suffix of the new pattern entry 276X. The match may be character-by-character or bit-by-bit. In some embodiments, the pattern matcher 230 may traverse through a set of characters corresponding to the suffix of the pattern entry 276A-N and through a set of characters corresponding to the suffix of the new pattern entry 276X. In traversing through the characters, the pattern matcher 230 may compare each character of the suffix of the pattern entry 276A-N with a corresponding character of the suffix of the new pattern entry 276X. If all the characters match, the pattern matcher 230 may determine that the URL 250 used to generate the new pattern entry 276x matches at least one URL used to create the catalogued pattern entry 276A-N in the hash map 270. Otherwise, if at least one character does not match, the pattern matcher 230 may determine that there is no match between the URL 250 for the new pattern entry 276X and the URL used to create the catalogued pattern entry 276A-N. The pattern matcher 230 may then identify the next catalogued pattern 276A-N in the bucket 272A-N, and repeat the above described functionality.

The pattern matcher 230 may repeat the above described functionalities of comparing the prefixes and suffixes of the pattern entries 276A-N of the bucket 272A-N associated with the hash value calculated from the host prefix 266 with those of the new pattern 276X. If none of the pattern entries 276A-N of the bucket 272A-N match, the pattern matcher 230 may determine that there is no match between the URL 250 for the new pattern entry 276X and any of the URLs used to create the catalogued pattern entry 276A-N. In some embodiments, the pattern matcher 230 may maintain a counter to keep track of the number of pattern entries 276A-N traversed in the bucket 272A-N. Each time the pattern matcher 230 determines that the URL 250 does not match the URL used to generate the identified pattern entry 276A-N, the pattern matcher 230 may determine whether there are more pattern entries 276A-N in the bucket 272A-N. In some embodiments, the pattern matcher 230 may identify a total number of pattern entries 276A-N in the identified bucket 272A-N. The pattern matcher 230 may determine a number of pattern entries 276A-N compared with the new pattern entry 276X, and may compare the number of compared pattern entries 276A-N with the total number to determine whether there are more pattern entries 276A-N to traverse. If none of the pattern entries 276A-N match with the new pattern entry 276X, the pattern matcher 230 may determine that the URL 250 does not match with any of the URLs catalogued in the hash map 270.

Based on whether the URL 250 matches with any URL catalogued in the hash map 270, the policy manager 240 may apply a policy using the URL 250. The policy may be stored and maintained on the policy database 245. The policy applied by the policy manager 240 may depend on the configuration of the hash map 270. In some embodiments, the hash map 270 may function as a whitelist. In some embodiments, the policy manager 240 may permit access to the online resource referenced by the URL 250, responsive to identifying a match between the URL 250 and the URLs. In some embodiments, the policy manager 240 may add the URL 250 onto a separate whitelist to allow access to the online resource referenced by the URL 250. In some embodiments, the hash map 270 may function as a blacklist. In some embodiments, the policy manager 240 may restrict or interrupt access to the online resource referenced by the URL 250, responsive to identifying a match between the URL 250 and the URLs catalogued in the hash map 270. In some embodiments, the policy manager 240 may add the URL 250 onto a separate blacklist maintained on the policy database 245 to restrict access to the online resource referenced by the URL 250. In some embodiments, the policy manager 240 may generate or cause an alert prompt to be generated for intrusion detection, upon identifying a match between the URL 250 and the URLs catalogued in the hash map 270.

Figure 3A:
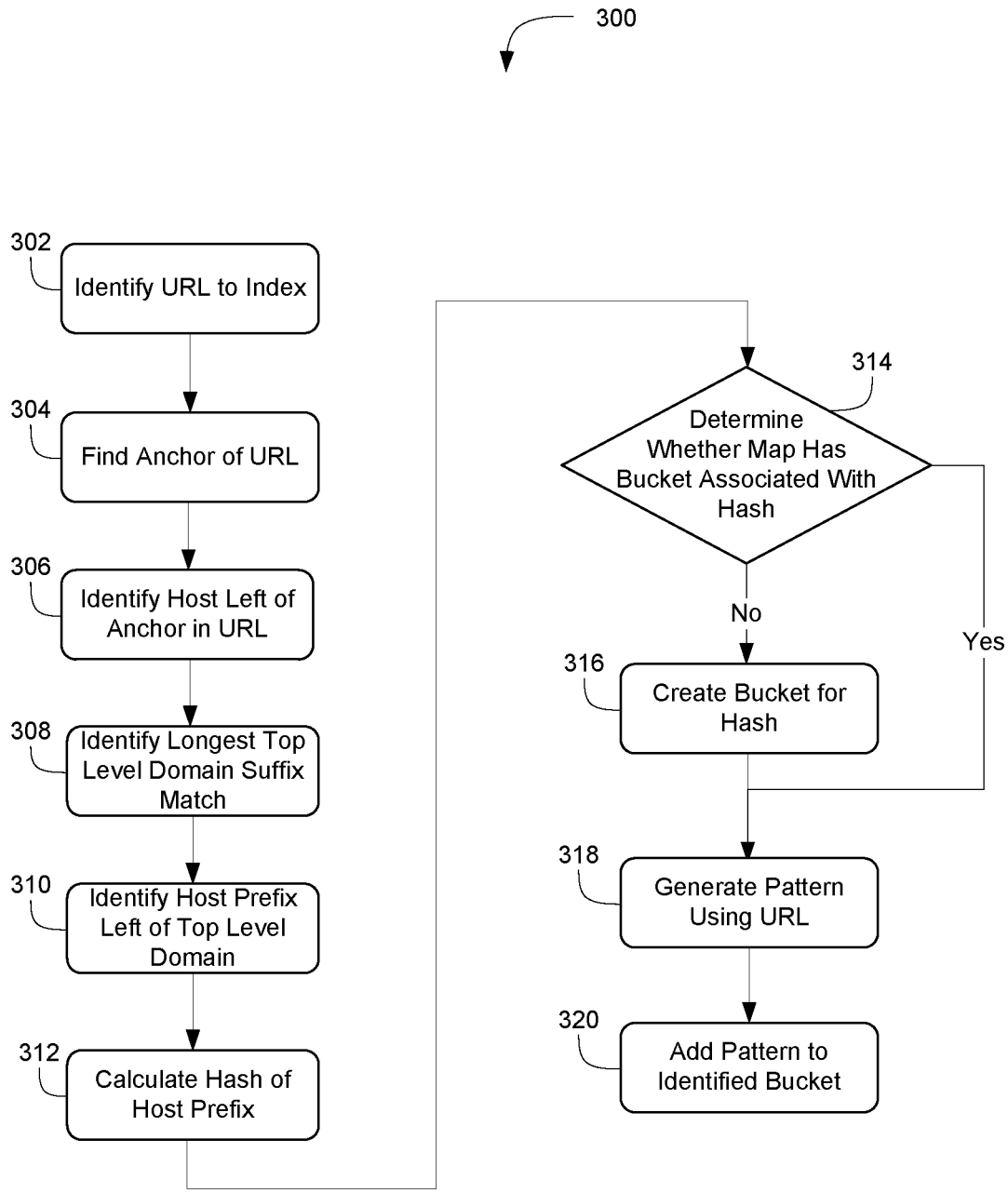
FIG. 3A is a flow diagram of an embodiment of a method of indexing Uniform Resource Locator (URL) patterns sets into a map.

Referring now to FIG. 3A, depicted is a flow diagram of an embodiment of a method 300 for deploying updates to multiple entities. The operations and functionalities of the method 300 may be performed by the computing device 100 or the system 200 detailed above, such as the anchored matching system 205. In brief overview, at step 302, the computing device may identify a Uniform Resource Locator (URL) to index. At step 304, the computing device may find an anchor of the URL. At step 306, the computing device may identify a host left of the anchor in the URL. At step 308, the computing device may identify the longest top-level domain suffix match. At step 310, the computing device may identify a host prefix left of the matching top-level domain. At step 312, the computing device may calculate a hash value of the host prefix. At step 314, the computing device may determine whether a map has a bucket associated with the hash value. If there is no bucket associated with the hash value, at step 316, the computing device may create a bucket associated with the hash value. At step 318, the computing device may generate a pattern entry using the URL. At step 320, the computing device may add the pattern entry to the identified bucket.

Figure 3B:
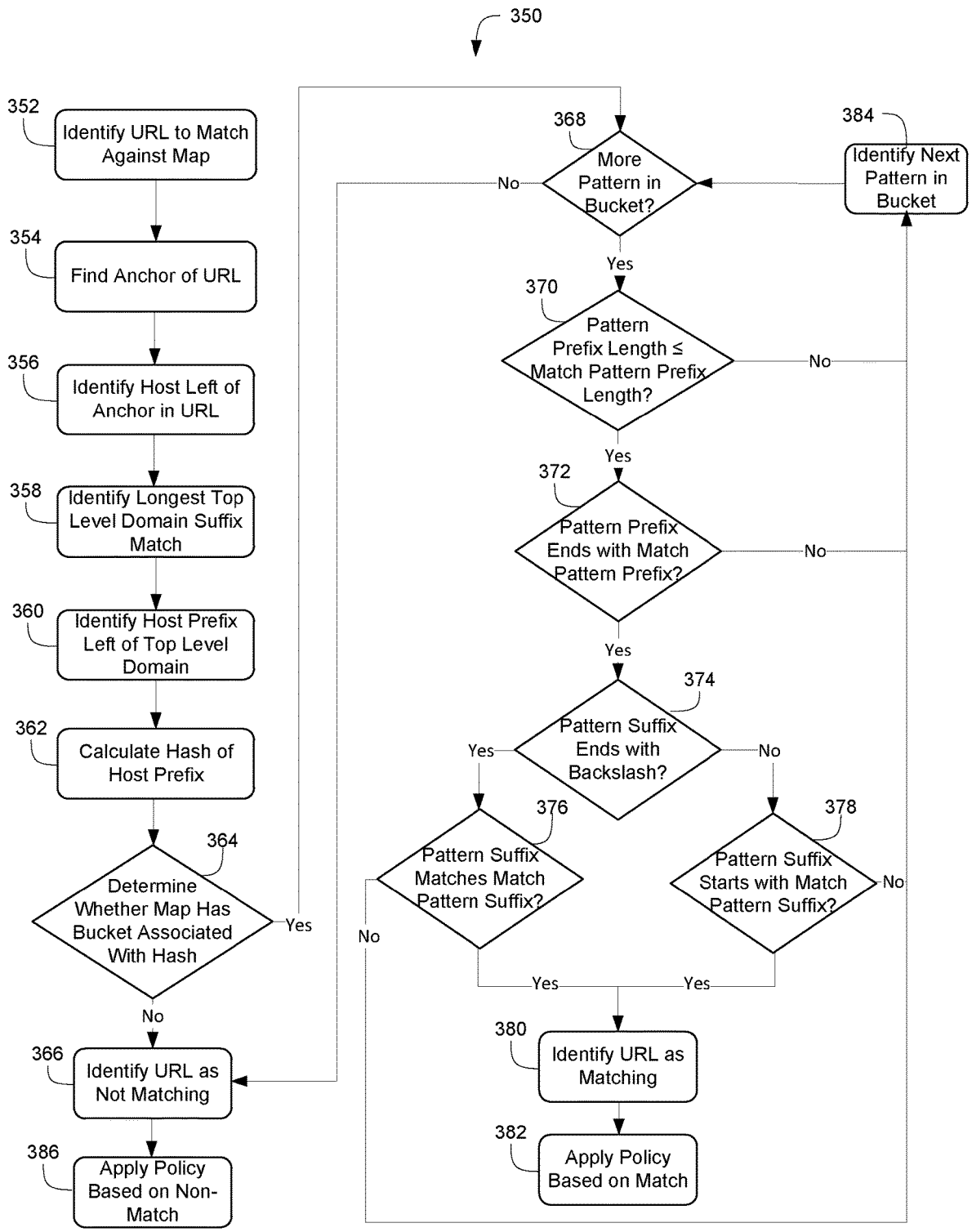
FIG. 3B is a flow diagram of an embodiment of a method of matching with indexed Uniform Resource Locator (URL) pattern sets.

Referring now to FIG. 3B, depicted is a flow diagram of an embodiment of a method 350 for deploying updates to multiple entities. The operations and functionalities of the method 350 may be performed by the computing device 100 or the system 200 detailed above, such as the anchored matching system 205. In brief overview, at step 352, the computing device may identify a Uniform Resource Locator (URL) to match against a map. At step 354, the computing device may find an anchor of the URL. At step 356, the computing device may identify a host left of the anchor in the URL. At step 308, the computing device may identify the longest top-level domain suffix match. At step 360, the computing device may identify a host prefix left of the matching top-level domain. At step 362, the computing device may calculate a hash value of the host prefix. At step 364, the computing device may determine whether a map has a bucket associated with the hash value. If there is no bucket associated with the hash value, at step 366, the computing device may determine that the URL does not match with any on the map.

Otherwise, at step 368, the computing device may determine whether there are any more pattern entries in the bucket. If there are more pattern entries in the bucket, at step 370, the computing device may determine whether a length of the prefix of the pattern entry is less than or equal to a length of the prefix of the pattern entry to be matched. If the length of the prefix of the pattern entry is less than or equal to, at step 372, the computing device may determine whether the prefix of the pattern entry ends with the prefix of the pattern entry to be matched. If the prefix of the pattern entry ends with the prefix of the pattern entry to be matched, at step 374, the computing device may determine whether the suffix of the pattern entry ends with a slash. If the suffix of the pattern entry ends with a slash, at step 376, the computing device may determine whether the suffix of the pattern entry matches the suffix of the pattern entry to be matched. If the suffix of the pattern entry does not end with a slash, at step 378, the computing device may determine whether the suffix of the pattern entry starts with the suffix of the pattern entry to be matched. If either the suffix of the pattern entry matches the suffix of the pattern entry to be matched or the suffix of the pattern entry starts with the suffix of the pattern entry to be matched, at step 380, the computing device may identify the URL as matching one in the map. Furthermore, at step 382, the computing device may apply a policy based on the match. On the other hand, if none of the determinations in steps 370-378 result in true, at step 384, the computing device may identify a next pattern entry in the bucket and may repeat the functionalities of steps 368-382 until there are no more pattern entries in the bucket. If there are no more pattern entries remaining the bucket, at step 366, the computing device may identify the URL as not matching. At step 384, the computing device may apply a policy based on the non-match between the URL and any indexed on the map.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, PYTHON, BASIC, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of matching with indexed Uniform Resource Locator (URL) pattern sets, comprising:
   establishing, by a device, a hash map identifying a plurality of buckets, each bucket of the plurality of buckets including a plurality of patterns, each pattern of the plurality of patterns in each bucket sharing a same host prefix of a respective uniform resource locator (URL), each bucket of the plurality of buckets indexed via the hash map by a hash of the host prefix of the respective URL, at least one of the plurality of buckets indexed by a first hash of a first host prefix of a first URL, the first URL having the first host prefix, a first prefix, and a first suffix;
   identifying, by the device, a second URL to perform a match against the hash map, the second URL including a second host prefix, a second prefix, and a second suffix;
   calculating, by the device, a second hash of the second host prefix of the second URL;
   determining, by the device, that the second hash matches an index of the first hash;
   identifying, by the device, from the plurality of buckets, a bucket corresponding to the index of the first hash determined to match the second hash;
   searching, by the device, the plurality of patterns in the bucket using the second URL to identify a match of a pattern corresponding to the first URL based at least on the first suffix, the second suffix, and a comparison between a first length of the first prefix and a second length of the second prefix; and
   applying, by the device, a policy using the second URL based on the identification of the match between the first URL corresponding to the pattern and the second URL.

2. The method of claim 1, wherein establishing the hash map further comprises:
   identifying the first URL to index into the hash map, the first URL having a plurality of characters referencing an online resource;
   identifying an anchor in the first URL corresponding to a position of a separator between a hostname and a file pathname in the first URL;
   identifying the host prefix in the first URL corresponding to a subset of characters prior to the anchor in the first URL;
   calculating the first hash from the subset of characters of the host prefix; and
   adding the pattern for the first URL into the hash map indexed by the first hash.

3. The method of claim 2, wherein adding the pattern into the hash map further comprises:
   determining that the bucket for the first hash does not exist in the hash map based on a plurality of hashes indexed on the hash map;
   inserting, responsive to determining that the bucket for the first hash does not exist, the bucket indexed by the first hash into the hash map; and
   adding the pattern into the bucket of the hash map for the first hash.

4. The method of claim 2, wherein adding the pattern into the hash map further comprises:
   determining that the bucket for the first hash exists in the hash map based on a plurality of hashes indexed on the hash map;
   identifying the bucket associated with the first hash on the hash map; and
   adding the pattern into the bucket of the hash map associated with the first hash.

5. The method of claim 1, wherein establishing the hash map further comprises generating the pattern to insert into the hash map, the pattern including the first URL, an anchor corresponding to a position of a separator between a hostname and a file pathname in the first URL, the first host prefix corresponding to a number of characters between the anchor and a host of the first URL, a path suffix corresponding to a first subset of characters subsequent to the anchor, the first prefix corresponding to a second subset of characters prior to the anchor, and the first suffix corresponding to a third subset of characters subsequent to the anchor.

6. The method of claim 1, wherein calculating the second hash of the second host prefix of the second URL further comprises:

identifying an anchor in the second URL corresponding to a first position of a separator between a hostname and a file pathname in the second URL;
identifying a host prefix in the second URL corresponding to a subset of characters prior to the anchor in the second URL; and
calculating the second hash from the subset of characters of the host prefix.

7. The method of claim 1, wherein searching to identify the match further comprises:
determining that the bucket for the first hash exists in the hash map based on a plurality of hashes indexed on the hash map;
identifying the first length of the first prefix corresponding to a first subset of characters in the first URL prior to a first separator between a first hostname and a first file pathname;
identifying the second length of the second prefix corresponding to a second subset of characters in the second URL prior to a second separator between a second hostname and a second file pathname; and
determining that the first length of the first is greater than or equal to the second length of the second prefix.

8. The method of claim 1, wherein searching to identify the match further comprises:
identifying a first prefix corresponding to a first subset of characters in the first URL prior to a first separator between a first hostname and a first file pathname;
identifying a second prefix corresponding to a second subset of characters in the second URL prior to a second separator between a second hostname and a second file pathname; and
determining that a terminal subset of characters for the first prefix matches the second prefix.

9. The method of claim 1, wherein searching to identify the match further comprises:
determining that a terminal character of the first suffix for the first URL includes a predetermined character; and
determining, responsive to determining that the terminal character of the first suffix includes the predetermined character, that the first suffix for the first URL matches the second suffix for the second URL.

10. The method of claim 1, wherein applying the policy further comprises applying the policy including at least one of adding the second URL onto a whitelist, adding the second URL onto a blacklist, controlling access of an online resource referenced by the second URL, or generating an alert prompt for intrusion detection.

11. A system for matching with indexed Uniform Resource Locator (URL) pattern sets, comprising:
a pattern indexer executable on a processor, coupled to memory of a computing device, and configured to establish a hash map identifying a plurality of buckets, each bucket of the plurality of buckets including a plurality of patterns, each pattern of the plurality of patterns in each bucket sharing a same host prefix of a respective uniform resource locator (URL), each bucket of the plurality of buckets indexed via the hash map by a hash of the host prefix of the URL, at least one of the plurality of buckets indexed by a first hash of a first host prefix of a first URL, the first URL having the first host prefix, a first prefix, and a first suffix;
a pattern matcher executable on the computing device configured to:
identify a second URL to perform a match against the hash map, the second URL including a second host prefix, a second prefix, and a second suffix;
calculate a second hash of the second host prefix of the second URL;
determine that the second hash matches an index of the first hash,
identify, from the plurality of buckets, a bucket corresponding to the index of the first hash determined to match the second hash; and
search the plurality of patterns in the bucket using the second URL to identify a match of a pattern corresponding to the first URL based at least on the first suffix, and the second suffix, and a comparison between a first length of the first prefix and a second length of the second prefix; and
a policy manager of the computing device, configured to apply a policy using the second URL based on the identification of the match between the first URL corresponding to the pattern and the second URL.

12. The system of claim 11, wherein the pattern indexer is further configured to establish hash map for each pattern by:
identifying the first URL to index into the hash map, the first URL having a plurality of characters referencing an online resource;
identifying an anchor in the first URL corresponding to a first position of a separator between a hostname and a file pathname in the first URL;
identifying the host prefix in the first URL corresponding to a subset of characters prior to the anchor in the first URL;
calculating the first hash from a subset of characters between the host prefix and the anchor in the plurality of characters for the first URL; and
adding the pattern for the first URL into the hash map indexed by the first hash.

13. The system of claim 12, wherein the pattern indexer is further configured to establish hash map for each pattern by:
determining that the bucket for the first hash does not exist in the hash map based on a plurality of hashes indexed on the hash map;
inserting, responsive to determining that the bucket for the first hash does not exist, the bucket indexed by the first hash into the hash map; and
adding the pattern into the bucket of the hash map for the first hash.

14. The system of claim 12, wherein the pattern indexer is further configured to establish hash map for each pattern by:
determining that the bucket for the first hash exists in the hash map based on a plurality of hashes indexed on the hash map;
identifying the bucket associated with the first hash on the hash map; and
adding the pattern into the bucket of the hash map associated with the first hash.

15. The system of claim 11, wherein the pattern comprises the first URL, an anchor corresponding to a position of a separator between a hostname and a file pathname in the first URL, the first host prefix corresponding to a number of characters between the anchor and a host of the first URL, a path suffix corresponding to a first subset of characters subsequent to the anchor, the first prefix corresponding to a second subset of characters prior to the anchor, and the first suffix corresponding to a third subset of characters subsequent to the anchor.

16. The system of claim 11, wherein the pattern matcher is further configured to:
- identify an anchor in the second URL corresponding to a first position of a separator between a hostname and a file pathname in the second URL;
- identify a host prefix in the second URL corresponding to a subset of characters prior to the anchor in the second URL;
- calculate the second hash from the subset of characters of the host prefix.

17. The system of claim 11, wherein the pattern matcher is further configured to search to identify the match by:
- determining that the bucket for the first hash exists in the hash map based on a plurality of hashes indexed on the hash map;
- identifying the first length of the first prefix corresponding to a first subset of characters in the first URL prior to a first separator between a first hostname and a first file pathname;
- identifying the second length of the second prefix corresponding to a second subset of characters in the second URL prior to a second separator between a second hostname and a second file pathname; and
- determining that the first length of the first prefix is greater than or equal to the second length of the second prefix.

18. The system of claim 11, wherein the pattern matcher is further configured to search to identify the match by:
- identifying a first prefix corresponding to a first subset of characters in the first URL prior to a first separator between a first hostname and a first file pathname;
- identifying a second prefix corresponding to a second subset of characters in the second URL prior to a second separator between a second hostname and a second file pathname;
- determining that a terminal subset of characters for the first prefix matches the second prefix.

19. The system of claim 11, wherein the pattern matcher is further configured to search to identify the match by:
- determining that a terminal character of the first suffix for the first URL includes a predetermined character; and
- determining, responsive to determining that the terminal character of the first suffix includes the predetermined character, that the first suffix for the first URL matches the second suffix for the second URL.

20. The system of claim 11, wherein the policy comprises at least one of adding the second URL onto a whitelist, adding the second URL onto a blacklist, blocking access of an online resource referenced by the second URL, or generating an alert prompt for intrusion detection.

* * * * *